US008909296B2

(12) United States Patent
Parkinson et al.

(10) Patent No.: US 8,909,296 B2
(45) Date of Patent: Dec. 9, 2014

(54) MOBILE WIRELESS DISPLAY SOFTWARE PLATFORM FOR CONTROLLING OTHER SYSTEMS AND DEVICES

(75) Inventors: Christopher Parkinson, Richland, WA (US); Jeffrey J. Jacobsen, Hollister, CA (US)

(73) Assignee: Kopin Corporation, Westborough, MA (US)

( * ) Notice: Subject to any disclaimer, the term of this patent is extended or adjusted under 35 U.S.C. 154(b) by 756 days.

(21) Appl. No.: 12/348,646

(22) Filed: Jan. 5, 2009

(65) Prior Publication Data

US 2009/0251409 A1 Oct. 8, 2009

Related U.S. Application Data

(63) Continuation-in-part of application No. 12/152,462, filed on May 14, 2008.

(60) Provisional application No. 61/010,090, filed on Jan. 4, 2008, provisional application No. 61/010,177, filed on Jan. 4, 2008, provisional application No. 60/930,232, filed on May 14, 2007.

(51) Int. Cl.
*H04B 1/00* (2006.01)
*G06F 3/14* (2006.01)
*G02B 27/01* (2006.01)

(52) U.S. Cl.
CPC ............... *G06F 3/14* (2013.01); *G02B 27/017* (2013.01); *G06F 3/1454* (2013.01); *G09G 2370/16* (2013.01)
USPC ........................... 455/565; 345/169; 455/566

(58) Field of Classification Search
CPC ....... G02B 27/017; G06F 3/14; G06F 3/1454; G09G 2370/16
USPC ....................................... 455/565, 566; 345/8
See application file for complete search history.

(56) References Cited

U.S. PATENT DOCUMENTS

| | | | |
|---|---|---|---|
| 6,073,034 A | 6/2000 | Jacobsen et al. |
| 7,068,258 B2 | 6/2006 | Cone et al. |
| 7,088,234 B2 | 8/2006 | Naito et al. |
| 7,158,096 B1 | 1/2007 | Spitzer |
| 7,278,734 B2 | 10/2007 | Jannard et al. |
| 7,312,981 B2 | 12/2007 | Carroll |
| 7,325,065 B1 | 1/2008 | Watkins |
| 7,512,414 B2 | 3/2009 | Jannard et al. |
| 7,917,608 B2 | 3/2011 | Tsunoda et al. |
| 8,060,014 B2 | 11/2011 | Ueda et al. |
| 8,164,773 B2 | 4/2012 | Montierth et al. |
| 2001/0034250 A1 | 10/2001 | Chadha |

(Continued)

OTHER PUBLICATIONS

The Bluetooth Specification vol. 1.0B Dec. 1999.*

(Continued)

*Primary Examiner* — David Bilodeau
(74) *Attorney, Agent, or Firm* — Hamilton, Brook, Smith & Reynolds, P.C.

(57) ABSTRACT

A wireless headset can incorporate a wireless communication controller that not only provides a video link to a host device, but also provides for control and management of a host device and other more devices. In this context, a host device may be any appropriate device that sources audio, video, text, and other information, such as a cell phone, personal computer, laptop, media player, and/or the like.

18 Claims, 11 Drawing Sheets

(56) References Cited

U.S. PATENT DOCUMENTS

| | | |
|---|---|---|
| 2002/0030649 A1 | 3/2002 | Zavracky et al. |
| 2002/0116392 A1 | 8/2002 | McGrath et al. |
| 2002/0158812 A1 | 10/2002 | Pallakoff |
| 2003/0001823 A1* | 1/2003 | Oya et al. .................. 345/169 |
| 2003/0017846 A1 | 1/2003 | Estevez et al. |
| 2003/0051083 A1 | 3/2003 | Striemer |
| 2003/0063043 A1* | 4/2003 | Girard ............................ 345/8 |
| 2003/0117587 A1 | 6/2003 | Olson et al. |
| 2003/0217166 A1 | 11/2003 | Dal Canto et al. |
| 2004/0031054 A1 | 2/2004 | Dankworth et al. |
| 2004/0041989 A1 | 3/2004 | Olson et al. |
| 2004/0046778 A1 | 3/2004 | Niranjan et al. |
| 2004/0229658 A1 | 11/2004 | Kim et al. |
| 2005/0086550 A1 | 4/2005 | Hammes et al. |
| 2005/0125840 A1 | 6/2005 | Anderson et al. |
| 2005/0201585 A1 | 9/2005 | Jannard et al. |
| 2005/0212749 A1 | 9/2005 | Marvit et al. |
| 2005/0286466 A1 | 12/2005 | Tagg et al. |
| 2006/0105806 A1 | 5/2006 | Vance et al. |
| 2006/0212611 A1 | 9/2006 | Fujii et al. |
| 2007/0038735 A1 | 2/2007 | Tsunoda et al. |
| 2007/0040035 A1* | 2/2007 | Kotlarsky et al. ........ 235/462.45 |
| 2007/0153374 A1 | 7/2007 | Travers |
| 2007/0171921 A1 | 7/2007 | Wookey et al. |
| 2007/0220108 A1 | 9/2007 | Whitaker |
| 2007/0247449 A1 | 10/2007 | Mack et al. |
| 2007/0260905 A1 | 11/2007 | Marsden et al. |
| 2007/0297005 A1 | 12/2007 | Montierth et al. |
| 2008/0021777 A1 | 1/2008 | Mack et al. |
| 2008/0089545 A1 | 4/2008 | Jannard et al. |
| 2008/0171561 A1 | 7/2008 | Irony et al. |
| 2008/0270621 A1 | 10/2008 | Haruki et al. |
| 2008/0270625 A1 | 10/2008 | Chaturvedi et al. |
| 2008/0291277 A1 | 11/2008 | Jacobsen et al. |
| 2009/0023395 A1 | 1/2009 | Chang et al. |
| 2009/0099836 A1 | 4/2009 | Jacobsen et al. |
| 2009/0109054 A1 | 4/2009 | Ueda et al. |
| 2009/0117890 A1 | 5/2009 | Jacobsen et al. |
| 2009/0160735 A1 | 6/2009 | Mack |
| 2009/0209205 A1 | 8/2009 | Kramer et al. |
| 2010/0273417 A1 | 10/2010 | Tian et al. |
| 2011/0001699 A1 | 1/2011 | Jacobsen et al. |
| 2011/0084900 A1 | 4/2011 | Jacobsen et al. |
| 2011/0187640 A1 | 8/2011 | Jacobsen et al. |
| 2011/0194029 A1 | 8/2011 | Herrmann et al. |

OTHER PUBLICATIONS

International Search Report for International Application No. PCT/US 08/06147, mailed on Jul. 16, 2008.

* cited by examiner

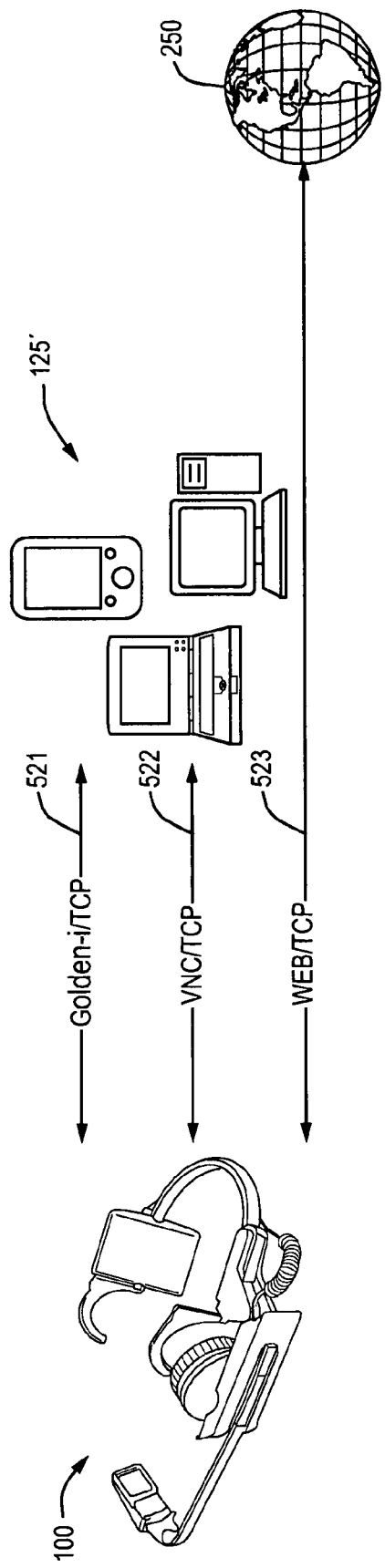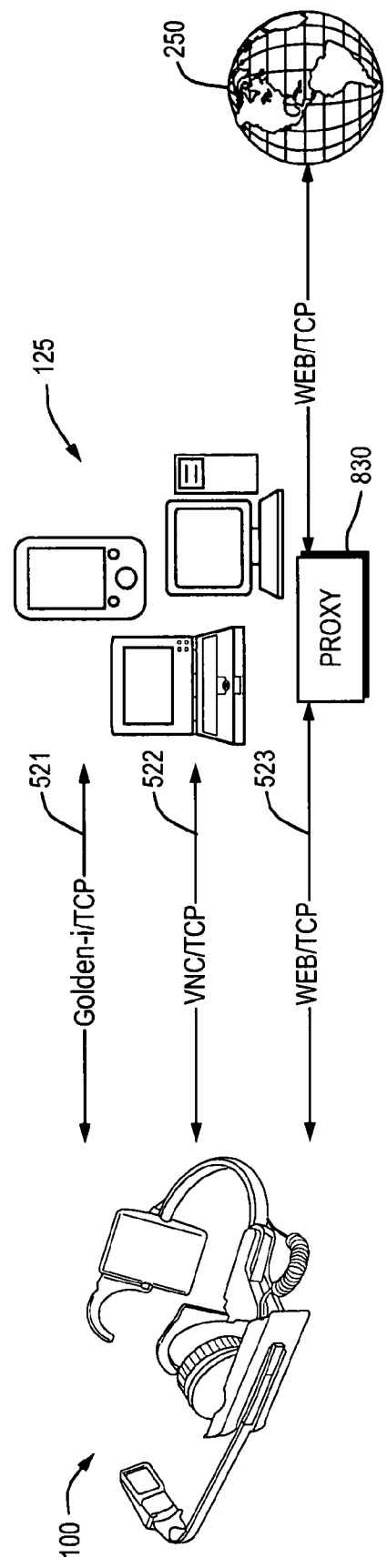
FIG. 8A
FIG. 8B

MOBILE WIRELESS DISPLAY SOFTWARE PLATFORM FOR CONTROLLING OTHER SYSTEMS AND DEVICES

RELATED APPLICATION(S)

This application claims the benefit of U.S. Provisional Application No. 61/010,090, filed on Jan. 4, 2008, and is a continuation in part of U.S. patent application Ser. No. 12/152,462, filed on May 14, 2008. The entire teachings of the above application(s) are incorporated herein by reference.

BACKGROUND OF THE INVENTION

Recent technology convergence between mobile phones and digital media players, such as with the iPhone™, are increasingly placing in the hands of consumers small, portable devices capable of storing large amounts of video content. While these handheld devices typically include a video screen, the visual experience of a high resolution, large format display can never be replicated in such a device simply because of the physical size limitations expected of a hand held device. As a result, consumers are now seeking high-quality, portable, color displays to augment their handheld video devices. One such display is worn on the user's face or head similar to a pair of eyeglasses or headphones. Through recent dramatic developments in optical technologies, these devices can provide the appearance of a large format, high resolution display.

One example of such a device is found in U.S. Pat. No. 7,088,234 issued to Naito, et al. and assigned to Matsushita Electrical Industries. The wearable information device described in that patent can display certain information to notify the user (e.g., information about arrival of an e-mail).

Another such device is described in U.S. Pat. No. 7,158,096 issued to Spitzer and assigned to MyVu Corporation. That device includes a projection type display attached to one end of a head-mountable support. An eyepiece assembly is attached to a second end of the support. The support maintains the projection system and the eyepiece assembly in alignment along an optical path.

A further device is described in U.S. patent application Ser. No. 12/152,462 by Jacobsen, et al. and assigned to Kopin Corporation, the teachings of which are incorporated by reference.

SUMMARY OF THE INVENTION

In most prior art arrangements, a video headset is connected to a base electronics Unit by means of a wire. While this provides a secure communication link with sufficient bandwidth to transport a high quality video signal, the need for a wire limits the mobility of the user.

A wireless headset, on the other hand, provides greater convenience and mobility and avoids the problem of broken connecting wires and the like. Furthermore, it is desirable for such a video headset to provide additional functionality beyond operating as a simple display device. For example, a wireless headset can incorporate a wireless communication controller that not only provides a video link to a host device, but also provides for control and management of a host device and other more devices. In this context, a host device may be any appropriate device that sources audio, video, text, and other information, such as a cell phone, personal computer, laptop, media player, and/or the like.

In general, the functional aspects of such a wireless headset include a user interface, a hardware interface, a wireless communication link such as a Bluetooth™, WiFi, Broadband, WiMax, Cellular, Satellite, Wireless broadcast interfaces, devices drivers associated with each of the desired controllable host types, device content, and other support functions, such as a software development kit (SDK) that allows for creation of applications for the platform.

In one particular embodiment, the user interface may consist of a device browser application that provides a user interface with menus, icons, and the ability to select operations thereon. Additional aspects needed to support the device browser application can include a base operating system kernel, such as a Windows CE, Windows Mobile or Linux kernel, drawing primitive functions, and windowing tool kit. The device browser application may also support additional interfaces, such as a speech input application, a Windows Side-Show application, a Virtual Network Computing (VNC) client application, Remote Desktop Protocol (RDP), and a web browser application and other common applications.

In still further detail of specs, the wireless interface may be implemented on a Bluetooth™ physical layer with a Bluetooth™ proxy which implements a packet switching gateway function between multiple device browser applications requiring multiple connection or sockets. This permits a single Bluetooth™ link to serve multiple client browser applications, each requiring multiple network connections, Thus, for example, multiple applications running on the wireless headset device, which might otherwise require multiple sockets or connections, can share a single Bluetooth™ connection. This also permits applications already developed for the wireless headset to run, unaltered, on the device.

The Bluetooth™ proxy layer is added between the Bluetooth™ physical network and a network protocol, e.g., Transmission Control Protocol (TCP), layer. The Bluetooth™ proxy layer intercepts and funnels communication requests onto a single Bluetooth™ socket.

In other aspects, a virtual network client connection like VNC, RDP, or SideShow run on the wireless headset device, and a virtual network server can run on one or more host devices. The virtual network client and server can be paired by coordinating the client address assignment with the Bluetooth™ device discovery process. A special local host port proxy can be set on the wireless headset device to always look for requests appearing on a special port for automatic assignment of TCP level addresses. In this way the headset is able to display and operate software applications that reside on the remote host and to access data from the remote host machine, without having to install and run additional applications on the headset device.

In still further aspects, device drivers may be provided for different types of host devices. These host device drivers may then use a page mark up language to reformat the content they provide to a generic format that can be interpreted by the wireless headset client device. This permits a given type of content, for example, such as email inbox content, to always be presented to the wireless headset device in an expected format regardless of the exact type of host device from which the content originates. So, for example, email inbox content originating from a Blackberry™ device will be presented to the device browser application in this same format as email inbox content originating from a Microsoft Windows™ based machine.

In some instances a direct connection to another Bluetooth device may be used to stream video and audio data at high speed. The stream may contain file extensions that could allow automatic playing of content.

The portable wearable display platform may accept user input and control from sources consisting of digital inputs, voice, Bluetooth keyboard and mouse. These sources of input will allow the user flexibility to navigate and modify content such as menuing, browsing, virtual connections and office products like e-mail, presentations and the like.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 7-9 are block diagrams illustrating a Bluetooth proxy for carrying data packets over a bidirectional communication path.

DETAILED DESCRIPTION OF THE INVENTION

A description of example embodiments of the invention follows.

Figure 1:
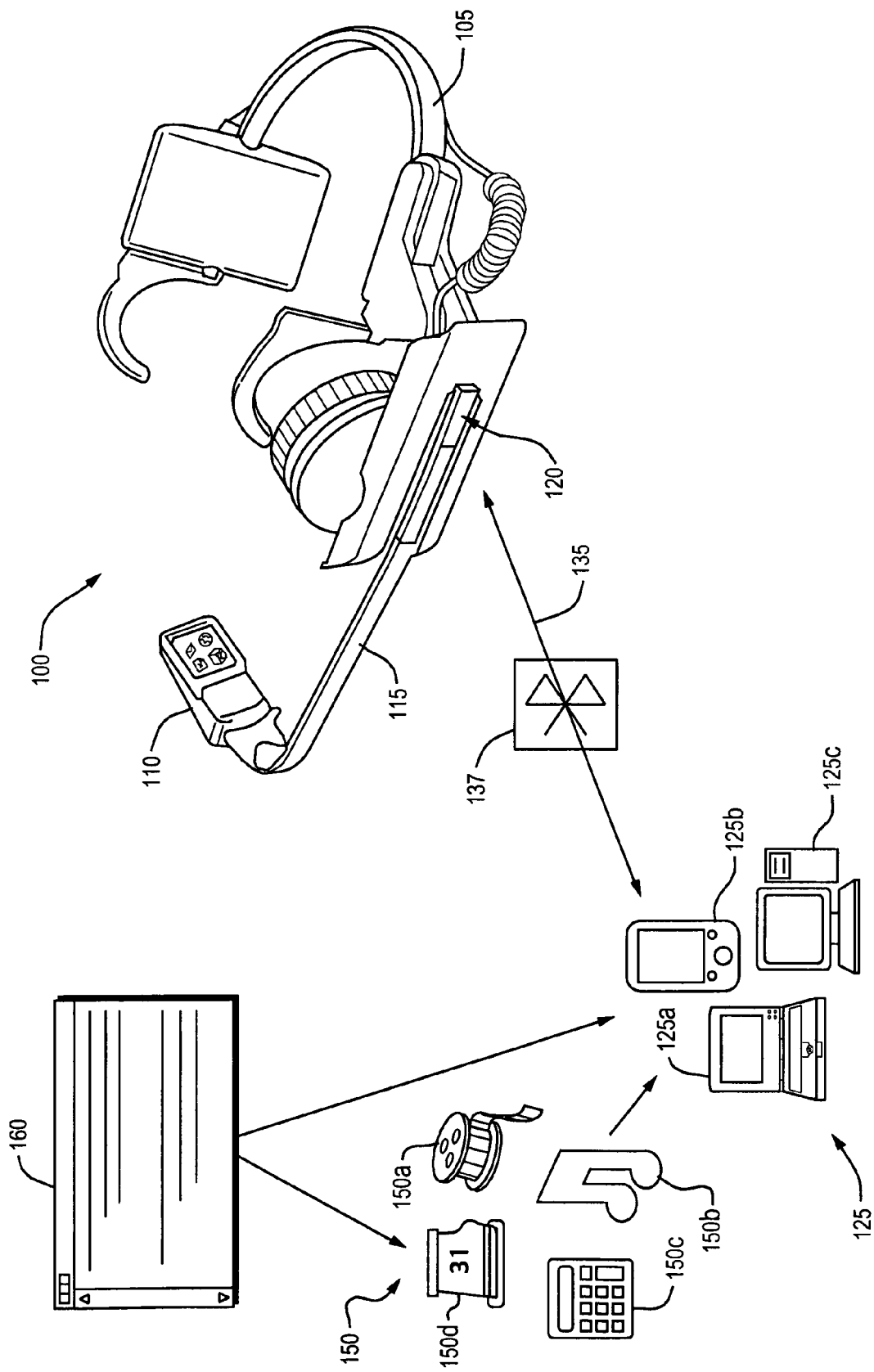
FIG. 1 is a diagram illustrating a perspective view of an example embodiment monocular display device according to the present invention, and wireless communications between the example embodiment monocular display device and host computing devices.

FIG. 1 is a diagram of a display device 1100. In one embodiment, the display device may be a monocular display device 100. In such an embodiment, the display device 100 can be supported by a housing 102 having a display panel 110 and earpiece 108. The display 110 may be mounted to the housing 102 via an adjustable arm 115. In another embodiment, the display panel 110 may be a handheld microdisplay. More details of such a monocular display device 100 are provided in U.S. patent application Ser. No. 12/008,114 entitled "Monocular Display Device", filed Jan. 8, 2008.

The example embodiment display device 100, preferably, can establish a two-way or bidirectional wireless communication link 135 with a host computing device 125. Thereafter, the device 100 can send and receive data from and to the host device 125 across the wireless link 135 with a high data transfer rate. The display device 100 can convert the received data across the wireless link to multimedia including graphical video data to display images on the display panel 110, which may originate from the host computing device 125 or, alternatively, from another remove database or source, such as a remote memory.

In one embodiment, the wireless communication link 135 uses short range or long range radiofrequency signals over a designated channel to communicate data between devices 100, 125 in a protocol that is known by both devices 100, 125. Preferably, the radiofrequency signals are low power (e.g., in a range of about 1.0 mWatt to 100 mwatts) so as to transmit the radiofrequency signals across a desired distance, which can be from several feet or greater than twenty feet in length.

In one embodiment, the display device 100 uses a Bluetooth™ 137 communication standard to communicate with the host computing device 125. In one embodiment, the Bluetooth™ connection permits data communication at a data transfer rate of around 1 Mbps with another computing device about 10 meters away using a 2.4 Gigahertz (GHz) frequency.

In another embodiment, the wireless communication link 135 may use Institute of Electrical and Electronics Engineers (IEEE) 802.11 (b), IEEE 802.11(g), or other standard. In yet another embodiment, the wireless communication link 135 may include Bluetooth™ 3.0 with a data transfer rate of about 480 Mbps, Ultra-wideband (UWB), Wireless Universal Serial Bus (USB)™, WirelessHD™, Wireless High Definition Multimedia Interface (Wireless HDMI™), WiFi, or any other high speed digital communication standard known in the art. In a further alternative embodiment, the display device 100 may communicate with the host computing system 125 using a wired connection, instead of link 135 such as, for example, a serial port, or a USB cable, or other wired connections. Alternatively, the wireless communication link 135 may include a Code Division Multiple Access (CDMA) standard, a Time Division Multiple Access (TDMA) standard, or Frequency Division Multiple Access (FDMA) standard or, alternatively, any other frequency hopping standard in spread spectrum communication known in the art to communicate data. Various protocol standards for wired and wireless communication are known in the art, and the present device 100 is not limited to any specific link, or radio frequency protocol.

The present display device 100 uses the two-way or bidirectional wireless communication link 135 with the computing device 125 to playback video and audio on the monocular display panel 110. The display device 100 also controls the host computing device 125, such as, for example, a wireless laptop 125a, to run business applications, retrieve e-mail, and run executable code, and applications from the laptop 125a across the wireless link 135. In this regard, the display device 100 may include an input device 120 (e.g., input device 335 of FIG. 3) that can transmit a wireless input signal to the host computing device 125. The input signal can control the host computing device 125 to provide control signals to run applications on the host computing device 125. Thereafter, the host computing device 125 outputs a graphical output to the display element 110 for a remote display of applications operating at the host computing device 125 at the display device 100, which may be located a distance away from the host computing device 125. Hosts 125 source content 150 of various types for viewing on the display panel 110, including video 150a, audio 150b, computer data 150c, and other types of information, such as calendar 150d, email and any number of types of data that would regularly be found from hosts 125.

It should be appreciated that the display device 100 is not limited to using any specific host computing device 125, and it should be appreciated that the discussion with regard to the laptop computer 125 is merely illustrative and is not limiting. The present display device 100 may, instead, communicate with other mobile portable devices or informational databases, such as, for example, a cell phone, Personal Digital Assistant (PDA), such as a PALM™ compatible device, desktop computer, tablet computer, mobile e-mail communication device, such as, for example, a Blackberry™ device or a Good Technology™ compatible device, or personal digital music or video player, such as, for example, an Apple iPod™ video and audio player, Microsoft Zune™ multimedia players, and other Motion Picture Experts Group (MPEG)-1 Audio Layer 3 (MP3) music players, digital video players, or drives. The host computing devices 125 also can include automotive systems, Global Position System (GPS) devices, satellite radio and terrestrial digital radio receivers or players, such as, for example, XM Satellite Radio™, Sirius Satellite Radio™ or HD Radio™ compatible devices. The host computing devices 125 can also include mainframe computing devices, digital testing devices, diagnostic equipment, a TiVo™ or other digital video recorder, a set top cable box, or any other digital or analog device known in the art.

The host computing device 125 may communicate with remote databases, and may act as an intermediary between the display device 100 and a source of multimedia content, or site, so that the user can view multimedia (in the peripheral vision of the wearer) without the associated heavy computing device and network connections associated with obtaining the multimedia content. The display device 100 may be very lightweight, in the order of a few ounces, and supported by the wearer so the wearer can move in an obstructed manner to engage in normal day-to-day activities.

The host computing device 125 may be a personal computing device, such as, for example, a desktop or laptop computer that includes an operating system (OS), such as, for example, the Microsoft Windows Vista™, Microsoft Windows Mobile™, Apple Mac OSX™, Symbian™ compatible operating systems, Lenovo compatible operating systems, the Linux operating system, the UNIX operating system or another known suitable operating system that is Internet ready, and configured for wireless mobile operation.

Further, a software System Development Kit (SDK) 160 may be used by an application programmer to specify interfaces for hosts 125, thereby permitting content 150 to be displayed on display 110. For a number of reasons, the device 100 may not be able to simply display existing web and other types of content. In particular, the content 150 needs to be specially designed and implemented to fit the display 110. To encourage this, the developer SDK 160 enables developers to quickly and easily develop the graphical portion of their applications. The backend of these same applications is then coded into a programmers language of choice for the particular device 100, as will be described in more detail below.

Figure 2:
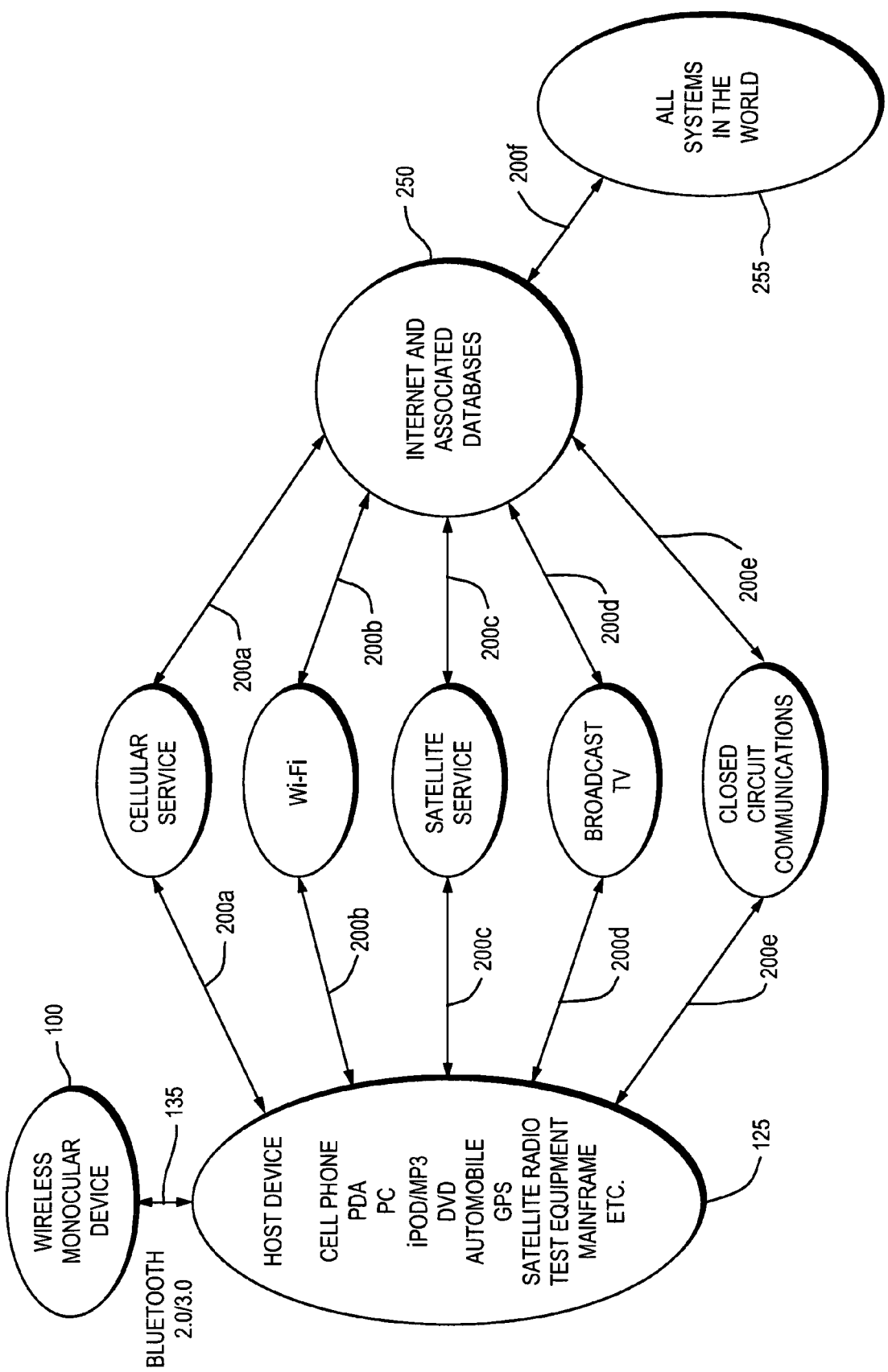
FIG. 2 is a network diagram illustrating communications between an example embodiment monocular display device and host computing devices, and communications between the host computing devices and other external databases and the Internet for delivery of multimedia content to the monocular display device.

FIG. 2 is a diagram illustrating an example embodiment display device 100 interacting with a host computing device 125. The host computing device 125 obtains information along a bi-directional communication path(s) such as cellular service 200a, WiFi™ 200b, satellite service 200c, broadcast television 200d, and closed circuit communications 200e to the Internet 250 or associated databases 255 for which to display content on the display panel 110 of the display device 100.

In one embodiment, the communication path 200a may be a cellular mobile communication wireless path, and each path may be different or the same relative to the remaining bidirectional communication paths 200b-200e. In one embodiment, the host computing device 125 may obtain information using Sprint™ EV-DO Wireless Broadband Connection, and then communicate with the display device 100 using a Bluetooth™ wireless connection 135.

In another embodiment, the communication path 200b may be a WiFi™ communication path or similar radiofrequency signal communication link. The host computing device 125 may communicate with satellite services providers, digital video recorders, broadcast television providers, or closed circuit communication devices using respective paths 200c, 200d, 200e. Paths 200a-200e may also be associated with a public access wireless hot spot.

It is appreciated that the present display device 100 may be compatible with NASCAR™ Nextel Fan View™ to watch closed circuit television of sporting events, and/or Kangaroo TV™ broadcast devices for displaying closed circuit television events. The present display device 100 may be configured to receive live broadcasts, can receive multiple different broadcast views of sporting events in real time (of the same or different events), statistical information, and audio data.

The host computing device 125 may access a World Wide Web (WWW) server on the Internet 300 along paths 200a, 200b, and obtain information, which is held and displayed to the display panel 10 along communication link 135. In one embodiment, the data can be in a known data format such as, for example, Hyper Text Markup Language (HTML), Extensible Markup Language (XML), Joint Photographic Experts Group (JPEG), Waveform (WAV), Audio Interchange File Format (AIFF), Bitmap (BMP), Picture (PICT), Graphic Interchange Format (GIF), and Windows Media Video (WMV), or any other data format suitable for multimedia content including streaming video, and audio. The data can be obtained from the Internet from databases 305 along path 200f. Various communication path configurations are possible and within the scope of the present disclosure.

The host computing device 125 can send and receive data along a wireless communication path 200b to the Internet and other system web pages or information databases 300 using HTML along bidirectional communication path 200b. The host computing device 125 may include Internet browsing software (such as know web browsers including, Microsoft Internet Explorer™, Opera™, Netscape Navigator™, and Mozilla Firefox™) to send and receive data along paths 200a and 200b. It should be appreciated that the host computing device 125 may be connected to the Internet by a cellular telephone network, and/or an Internet Service Provider Gateway Server.

Moreover, the present display device 100 may be configured to receive push e-mail, pull e-mail or periodically forwarded e-mail from e-mail accounts, such as, for example MSN™ Hotmail™, Google™ Gmail™, Yahoo!™ mail, AOL™ Mail, or any other e-mail provider or Internet site known in the art along path(s) 200a through 200e.

In one embodiment, the wireless link 135, or communication paths 200a through 200e, may be compatible for use with a Staccato Communication™ UWB USB that includes a radiofrequency (RF) transceiver, a digital baseband, and an interface to provide for wireless connectivity up to 480 Mbps on a single chip footprint, which can be located in the display device 100, or in the host computing device 125.

In this aspect, the display device 100 may initiate a first wireless communication path with the first device and also simultaneously initiate a second wireless communication path with the second device. The first and the second communication paths may be the same or different, and may configured over a Bluetooth™ connection, or a modified Bluetooth™ connection, or another protocol. In one aspect, the communication path may be a Bluetooth™ 2.0 or 3.0 connection, an IEEE 802.11 or IEEE 802.15 wireless communication protocol, and the connection may be suitable to communicate over a number of channels simultaneously with a variable bit rate, and a variable buffer. In an alternative embodiment, the communication path may be a Bluetooth™ connection, and the connection may be suitable to communicate over all channels simultaneously with a variable bit rate, and a variable buffer.

Alternatively, the display device 100 can pair with a cell phone and a laptop computer having a wireless modem to make a call using the cell phone using the device 100, while controlling the laptop computer to play video, which is transmitted over a Bluetooth™ connection to be displayed on device 100. Various configurations are possible and within the scope of the present disclosure, and it should be appreciated that the device 100 may control three or more devices, or more by establishing more than one wireless communication link.

Figure 3:
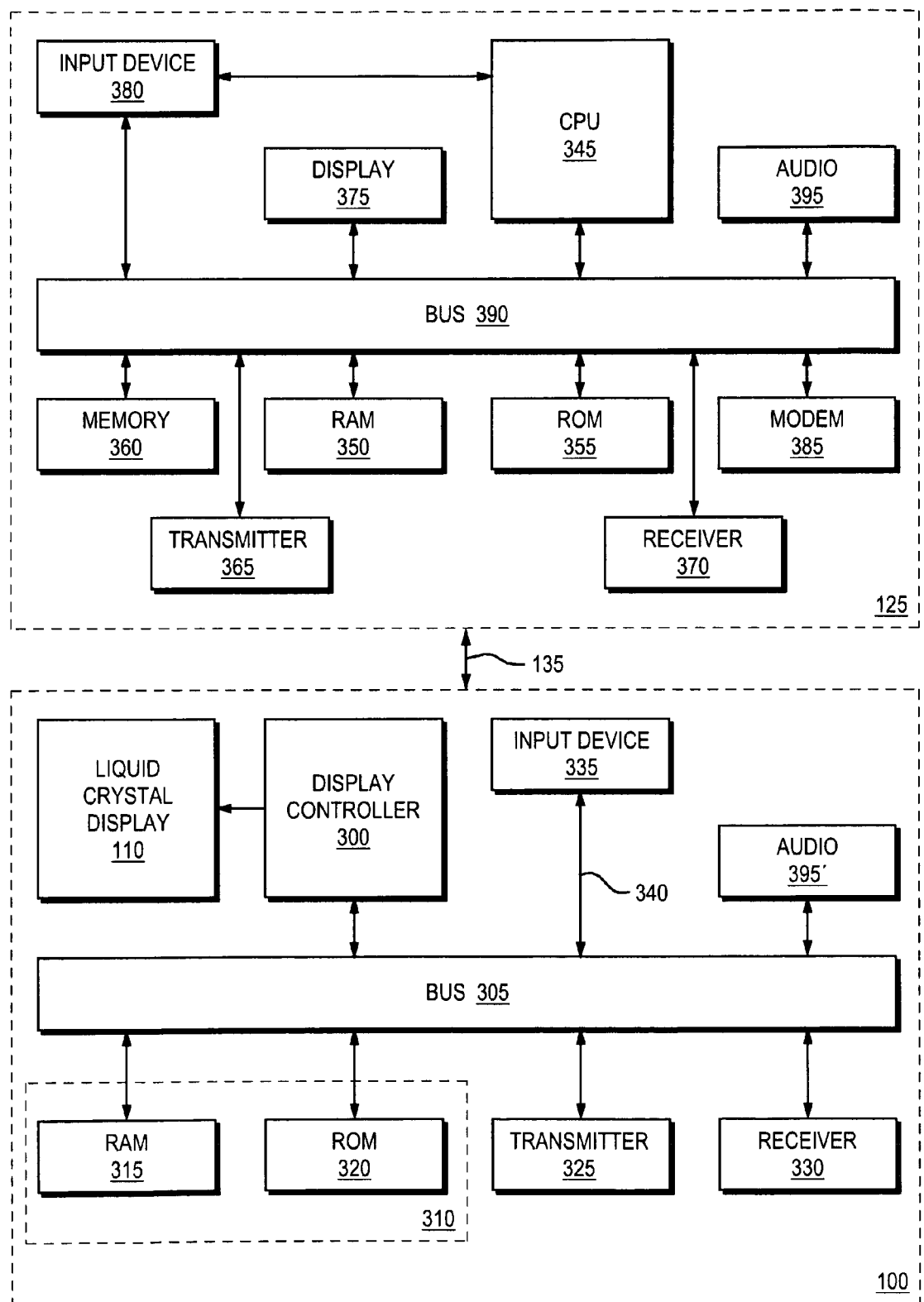
FIGS. 3-4 are block diagrams illustrating simplified schematic drawings of internal components of example embodiment monocular display devices and host computing devices adapted to wirelessly transmit data over a bidirectional communication path.

FIG. 3 illustrates a simplified block diagram of a non-limiting example embodiment of the present display device 100, for illustration purposes. The display device 100 includes a display panel 110 connected to a display controller 300, which may be a digital signal processor made by Intel™, Freescale Semiconductor™, or Advanced Micro-Devices (AMD)™, or another controller connected to a bus 305, such as a Peripheral Component Interconnect (PCI) bus. In one embodiment, the display panel 110 may be connected to a video graphics card (not shown) which is connected to the bus 305. The video graphics card can be an Accelerated Graphics Port (AGP) video card that fits to an AGP video card slot in the display device 100. The display device 100 also includes memory 310, such as a random access memory (RAM) 315 and a read only memory (ROM) 320 which saves executable program instructions, and communicates the program instructions to the controller 300 through bus 305. Preferably, the display device 100 further includes a transmitter 325 and a receiver 330, and/or a combined transceiver (not shown), both of which are connected to the bus 305 to form a wireless interface with the host computing device 125. The transmitter 325 and receiver 330 also are connected to the display controller 300 and receive instructions for control thereof.

The display device 100 also includes an input device 335 which can be a wireless mouse, trackball, or keyboard, or other similar wireless device that may be wirelessly connected to the PCI bus 305 by a wireless link 340, which is received by the receiver 330. Alternatively, the input device 335 may be connected in a wired manner (not shown) to the bus 305 to provide an input signal to the controller 300. The input device 335 may control screen prompts on the display device 100, the host computing device 125, or both the display device 100 and the host computing device 125 with the display device 100 and the host computing device 125 in a master/slave networked relationship.

The display device 100 interrogates an external or host computing device 125 and is configured to establish a wireless link 135 with the host computing device 125 such that the host computing device 125 can provide uplink and downlink data to the display device 100 in a bidirectional manner across the wireless link 135. In one embodiment, the display device 100 can receive uplink data that is suitable to display graphical multimedia information on the display panel 110 of the display device 100.

The host computing device 125 includes a central processing unit 345, a memory having a RAM 350, a ROM 355, and also including a cached memory 360. The host computing device 125 further includes a transmitter 365 and receiver 370, and/or a combined transceiver (not shown). The host computing device 125 may also include a primary display 375 and an input device 380 which are both connected to a bus 390, such as a PCI bus, as shown. It should be appreciated that the bus 390 may be connected to a wired broadband connection (not shown), or a wireless broadband connection 385, a Digital Subscriber Line (DSL) connection, a cable modem, a media player, a music or video player, or any other suitable link to receive data from a database.

During an initial stage of operation, a bi-directional wireless link 135 is established between the transmitter of the display device 325 and the receiver of the host computing device 370 and an authentication process occurs across the wireless communication path 135. Thereafter, the display device 100 can wirelessly communicate with the host computing device receiver 370 over a wireless communication link 135, and the host computing device transmitter 365 can transmit signals to the display device receiver 330. In one embodiment, the display device 100, from its transmitter 325, may wirelessly communicate with the host computing device receiver 370 using a Bltetooth™ 2.0 or 3.0 wireless radiofrequency standard. In another embodiment, the display device 100 may wirelessly communicate using a wireless UWB communication link 135, or using short-range radio frequency signals 135.

In one non-limiting embodiment, the central processing unit (CPU) 345 associated with the host computing device 125 executes program instructions and uses Microsoft Windows SideShow™ to interrogate the display device 100 to allow the display device transmitter 325 and receiver 330 to access the cached memory 360 of the host computing device 125. The contents of the cached memory 360 is then communicated to the bus 390 and to the transmitter 365. Controller 345 outputs a control signal to transmit data from the transmitter 365 to the display device 100, and to display multimedia on the display panel 110 when the host computing device 125 is off, or without power. Upon receipt by the receiver 330, the receiver 330 communicates with bus 305 to transmit the received data to display controller 300.

Display controller 300 outputs control signals to the display panel 10 to display images. This allows the display device 100 to receive data stored on the cache memory 360 of the host computing device 125. When the host computing device 125 is not in use, or switched off, the data viewed on the display device 100 is from the cached memory 360, and not updated. This data may be slightly older and not refreshed through the communication links 200a through 200e, as compared with when the host computing device 125 is operational. It should be appreciated that the display device 100 and the host computing device 125 also include audio devices 395, 395' that receive a control signal and play audio in response thereto.

Figure 4:
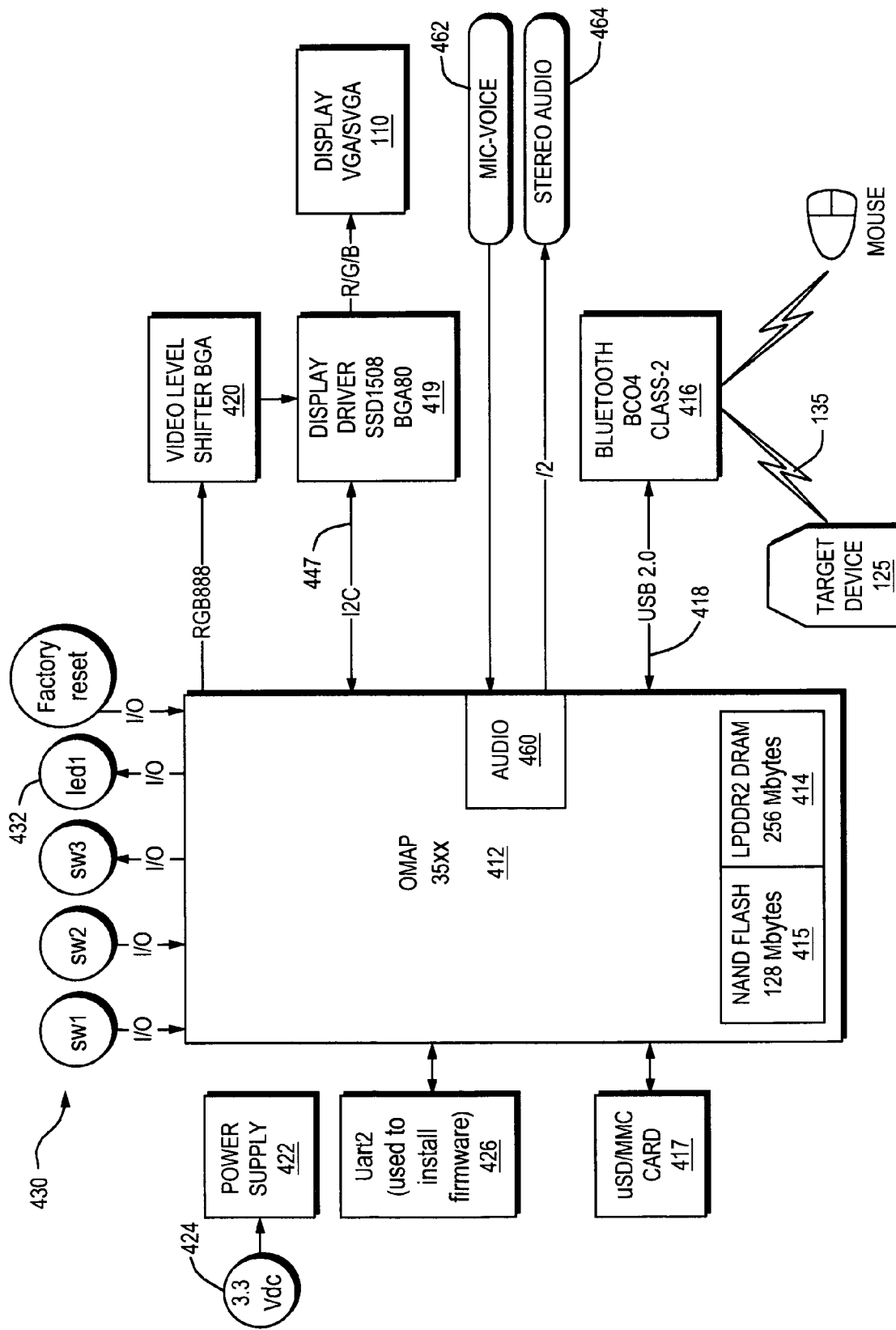

FIG. 4 provides a more detailed view of the electronic components incorporated into the display device 100, which is connected to the host computing device 125 to receive a digital video signal over a Bluetooth™ connection.

In the preferred embodiment, the display device 100 includes an Advanced Reduced instruction set computer (RISC) Machine (ARM)/Digital Signal Processor (DSP) 412 (which may be an Open Multimedia Application Platform (OMAP) 3500 series processor, available from Texas Instruments™ of Dallas, Tex.), memory 414, Bluetooth™ interface 416 which may be provided by a Class 2 Bluetooth™ interface available from Cambridge Silicon Radio™ (CSR) of Cambridge, England), display driver 419 (which may, for example, be an SSD1508 display driver available from Kopin Corporation™ of Westborough, Mass.), video level shifter circuits 420, a power supply 422 supported by a batter 424, universal asynchronous receiver/transmitter (UART) 426 (such as may be used for debugging) and memory 415. A Secure Digital (SD), eXteme Digital (xD), USB SD (uSD) memory 417 or other similar interfaces may be used to store application programs, kernel directives, or configuration data, and/or connect to devices such as a digital camera, A number of buttons 430 may be associated with the device (e.g., switch 1/switch 2/switch 3 and reset inputs) and a light-emitting diode (LED) output 432 (LED 1). A VGA or higher resolution (i.e., WVGA, SVGA, XGA, SXGA, UXGA or HDTV) display panel 110 and audio input and output device(s) 460, which may include microphone input 462 and stereo outputs 464, are also provided. The microphone 462 may receive verbal commands from a user to control the display device 100 and/or the host computing device 125.

These components are described in greater detail in a co-pending patent application by Wilfred I. Tucker, et al., U.S. patent application Ser. No. 12/348,627, entitled "METHOD AND APPARATUS FOR TRANSPORTING VIDEO SIGNAL OVER BLUETOOTH WIRELESS INTERFACE", which is hereby incorporated by reference.

Figure 5:
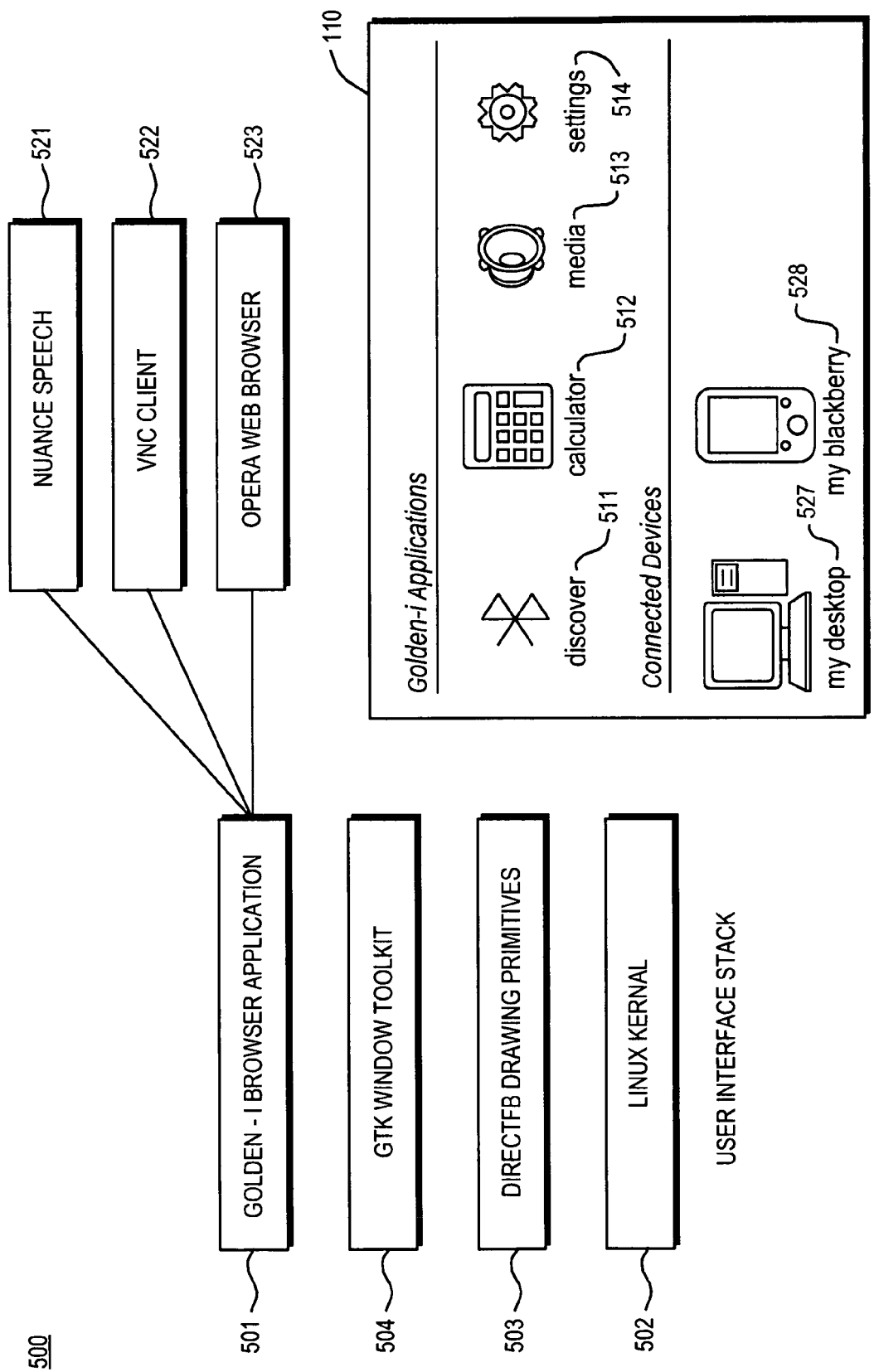
FIG. 5 is a high level software diagram indicating how the monocular display device can be used to control and manage various hosts through a user interface.

FIG. 5 is a high level software diagram indicating how the monocular display device 100 can be used to control and manage various hosts 125 through a user interface. A software stack 500 includes a device application browser 501 which may run on top of the kernel of an operating system (OS), such as a Linux kernel 502, drawing primitives, such as those provided by a Direct FB (DirectEB) stack 503, and a graphical tool kit, such as a Gimp Tool Kit (GTK) window tool kit 504. The device application browser 501 allows a user to access application software for wireless video headset 100 through an icon and menuing interface. This typically consists of custom code written for the particular device 100.

The OS 502 is ported to run on the processor in the wireless video headset 100, such as the OMAP 3500 series ARM/DSP shown in FIG. 4. The kernel level 502 otherwise provides standard operating system functions. The drawing prinitives layer 503 may be a somewhat thin graphical library that provides for graphic acceleration input device handling and abstraction integrated windowing system. The end result is a graphical user display, such as that shown in item 310 which has various applications available to the user, such as Bluetooth™ discovery 511, a calculator 512, media player 513 and a settings interface 514.

Applications running within the context of the device application browser 301 may include a speech input, a virtual networking client 322, and a web browser 323. Virtual networking is a system that allows a personal computer (PC) to be controlled remotely. It does this by exporting an entire screen display to another device in the form of a bitmap or graphics primitives. This exported data is wrapped in a network protocol and received by the device and simply displayed. Similarly, any mouse movements or keyboard entry data detected by the local device are passed directly to the remote PC to be acted upon.

The speech command interface 321 provides or allows for voice input commands to control the application browser 301. Thus, for example, a user may say the word "calculator"— where this is then detected by the speech device, the OS 302 launches the calculator application. In general, text labels displayed next to on-screen buttons or icons within the context of the application browser indicate a spoken word which will activate the corresponding button.

Digital inputs (switches) can also be used to navigate and select menu functions allowing for full control and editing of applications and associated data.

Discovery application 511, as will be understood shortly, allows not only for discovery of neighboring Bluetooth™ devices but also connecting them through to the application browser level. For example, shown in the example user display 510 is the fact that there are presently two connected devices, including a desktop computer 527 and a Blackberry™ 528. The devices 527, 528 have been discovered through operation of the discover application 511. This may be, for example, initiated on first power up of the wireless headset device 100 or by a user manually initiating a Bluetooth™ discovery process. The Bluetooth™ device discovery proceeds as per the Bluetooth™ specification, reporting any new Bluetooth™ layer devices as they are connected at a physical layer.

At this point, however, additional functionality is provided to permit communication within the Bluetooth™ devices at a network level. In particular, a client 527, 528 is told to open a special port on a localhost: address that is local to the wireless headset device. This device port acts as a proxy, always looking for such requests. When a request is received, it reports back an available network level address (i.e., such as a TCP/IP address) to be used by an individual device 327, 328 for network level communication.

Figure 6:
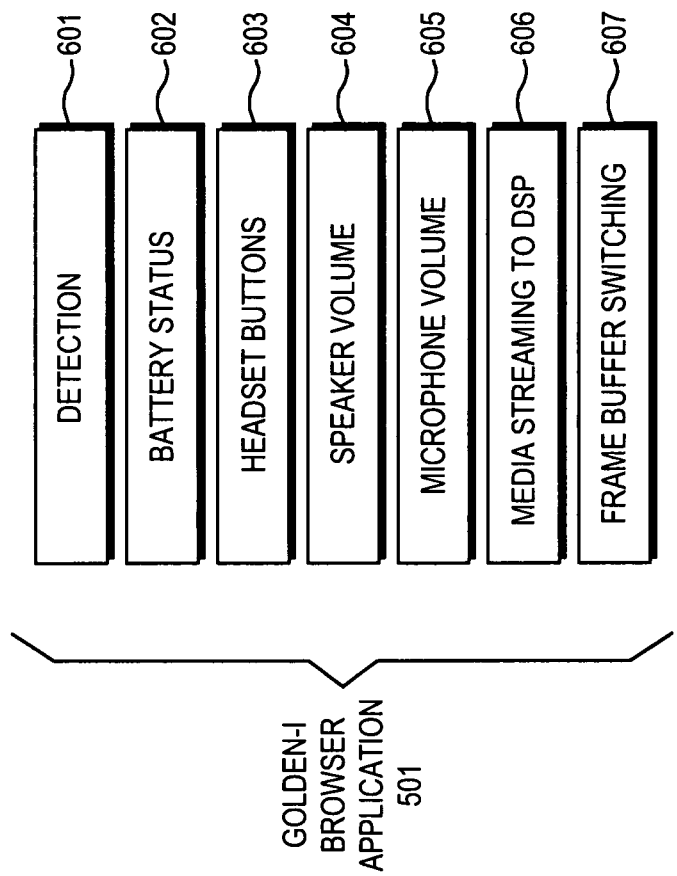
FIG. 6 is a diagram illustrating an example hardware interface of an example embodiment monocular display device.
Figure 6:
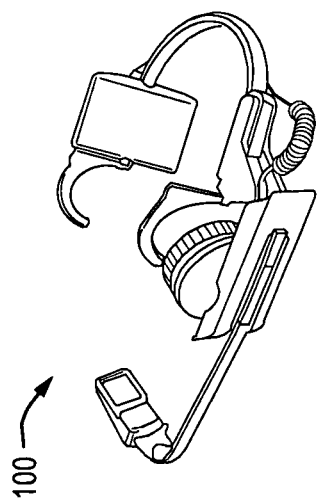

FIG. 6 illustrates hardware interface functionality 600 also provided by the browser application 501 of FIG. 5 which may receive and/or control various hardware functions on the device 100. Such functions may include headset detection 601, battery status 602, output device adjustment, such as headset button 603, speaker volume 604, microphone volume 605, media streaming functions 606, frame buffer switching 607, device drivers, and like functions.

Figure 7:
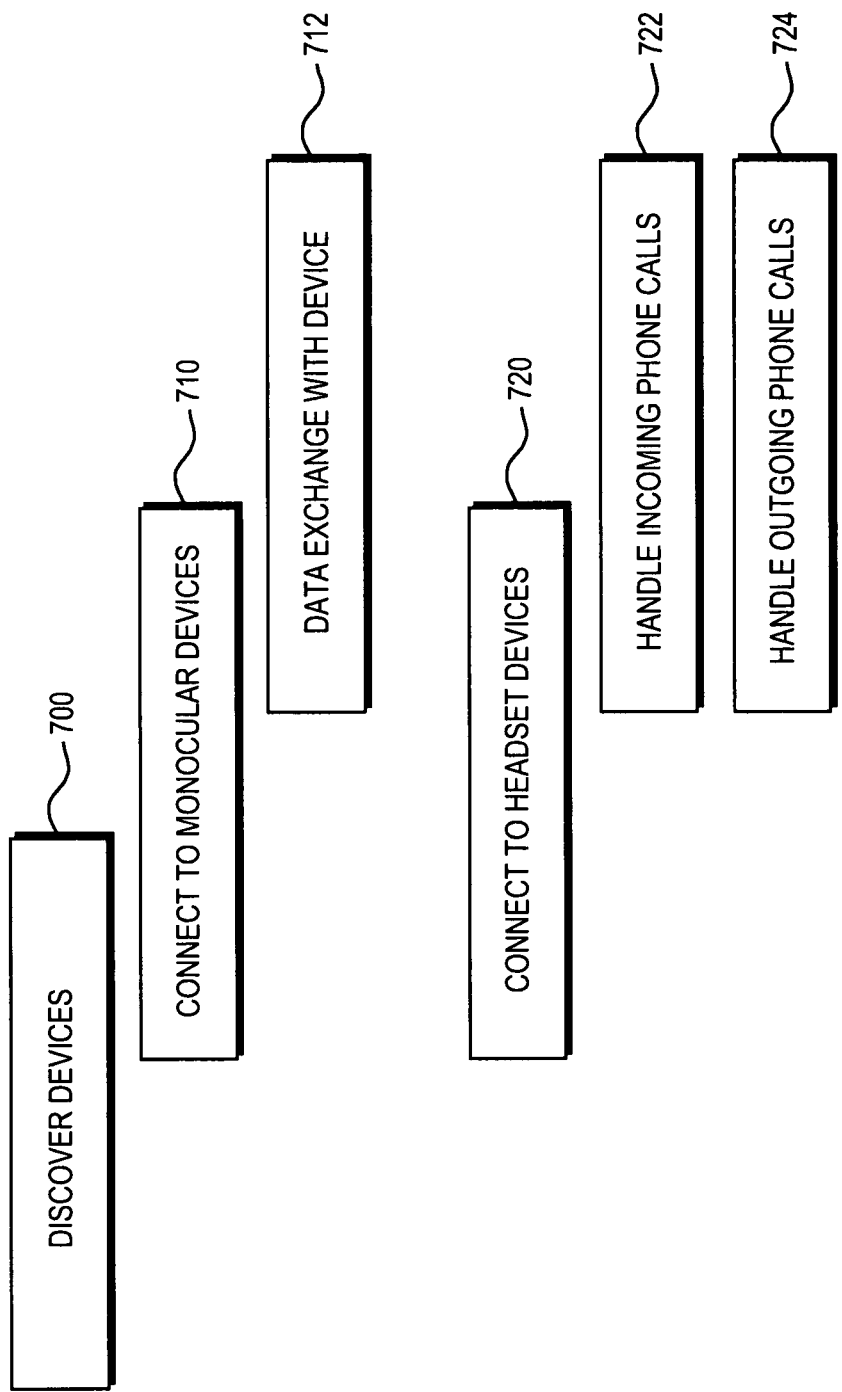

FIG. 7 illustrates a standard Bluetooth protocol stack implemented in the Bluetooth link 137 of FIG. 1, with the addition of a special proxy function. The Bluetooth™ layer does provide for discovery of Bluetooth™ devices 700 as in any standard Bluetooth™ device. However, headset devices 100 connected 710 will also provide for protocol information permitting data exchange with such devices 712. It can also connect to other types of headset devices 720, such as telephone headset devices which may provide for handling of incoming calls 722 and outgoing calls 724.

Figure 9:
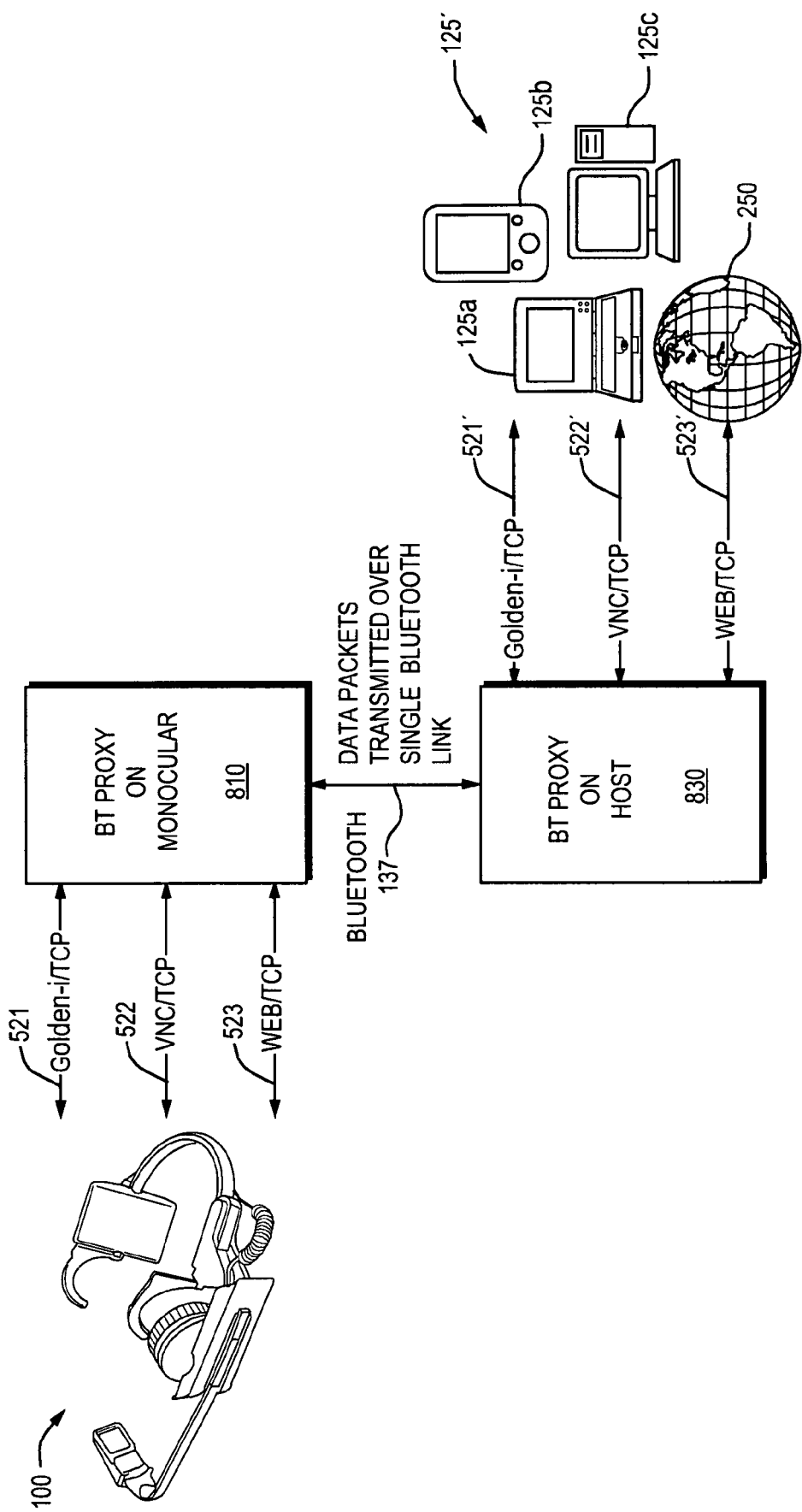

FIGS. 8A-8B and 9 show more detail of the proxy functionality provided by the Bluetooth™ interface 137.

FIG. 8A illustrates a traditional approach involving multiple direct TCP-layer connections to data sources. For example, each application running in the context of application browser 501 of FIG. 5, such as a speech recognition application 521, virtual network client 522, and a web browser client 523, might each require one or more TCP connections to the data sources provided by hosts 125'. Traditional systems involve multiple direct TCP connections to data sources.

FIG. 8B illustrates how, although Bluetooth™ itself does not provide any direct connection to the Internet 250 or other high layer networks, a connection between the monocular display device 100 and the internet 250 may be supported by a proxy 830 via an Internet enabled device 125. Bluetooth cannot connect directly to Internet; it must be proxied via an Internet enabled device. Thus, for example, applications such as the web browser 523 typically require host devices 125' to act as a networking proxy.

FIG. 9 illustrates a preferred arrangement in which a single Bluetooth link 137 supports multiple applications 521-523. The multiple application 521-523 require that the single Bluetooth™ connection 137 support multiple sockets, such as Transmission Control Protocol (TCP) connections. For example, while each application 521-523 might otherwise require multiple TCP connections, instead the Bluetooth™ proxy layer 910 added between the standard Bluetooth™ layer and regular TCP protocol layer funnels the multiple requested TCP connections onto a single socket. The single socket provided by Bluetooth™ link 137 then transports the multiple connections to the host.

A similar inverse functionality 830 provided on the host side 125 to unravel packets to their respective connection 521'-523'.

While Bluetooth™ itself does allow for multiple connection sockets between a host and client, many mobile phone operators impose a single connection limit. Thus, a single connection limit must be observed in many instances. This permits not only greater security, but avoids the possibility of having a wireless device be swamped with Bluetooth™ connection requests.

This approach also permits a standard web browser application 523, for example, to operate without requiring modification to its use of TCP sockets. Thus, the operation of the Bluetooth™ proxy 810 provided on the client 100 and proxy function 830 provided on the hosts 125 insulate the applications running within application browser 501 and also insulate the applications running on hosts 125 from such modified socket functionality. For example, the virtual network client running on client 100 now need not be modified.

Figure 10:
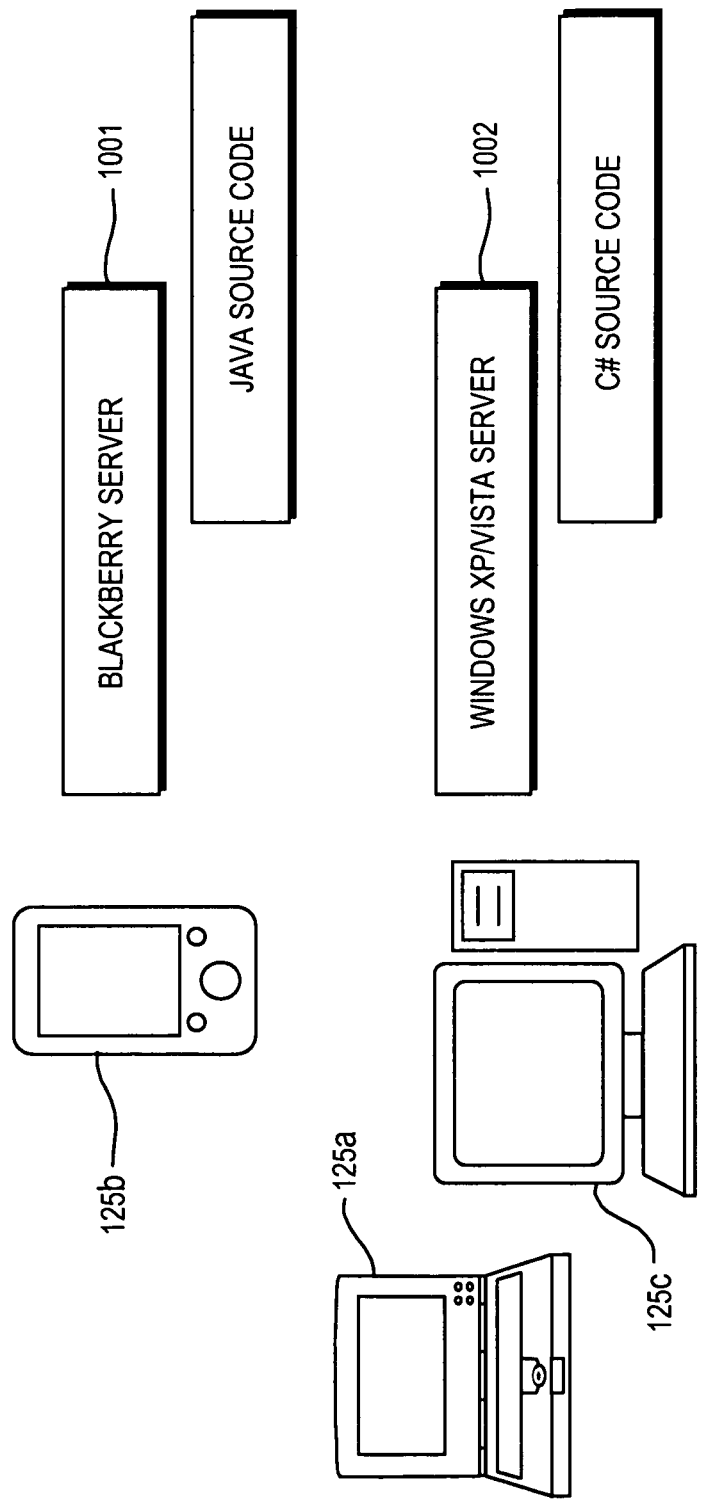
FIG. 10 is a block diagram illustrating device drivers.

FIG. 10 illustrates device drivers provided to insulate the device application browser 501 from having to know specifics of content format for particular host devices. Thus, for example, a Blackberry server 1001 is provided for a Blackberry host 125b, and a Windows Vista server 1002 is provided for a Windows machine host 125c. This allows the user interface specifics for particular hosts 125 to be presented as a generic interface to the wireless headset device 100. The servers 1001, 1002 provide at least two functionalities, including the Bluetooth™ proxy functionality 830 of FIG. 9 (i.e., unpacking TCP channel data into multiple required channels) and a content server.

Figure 11:
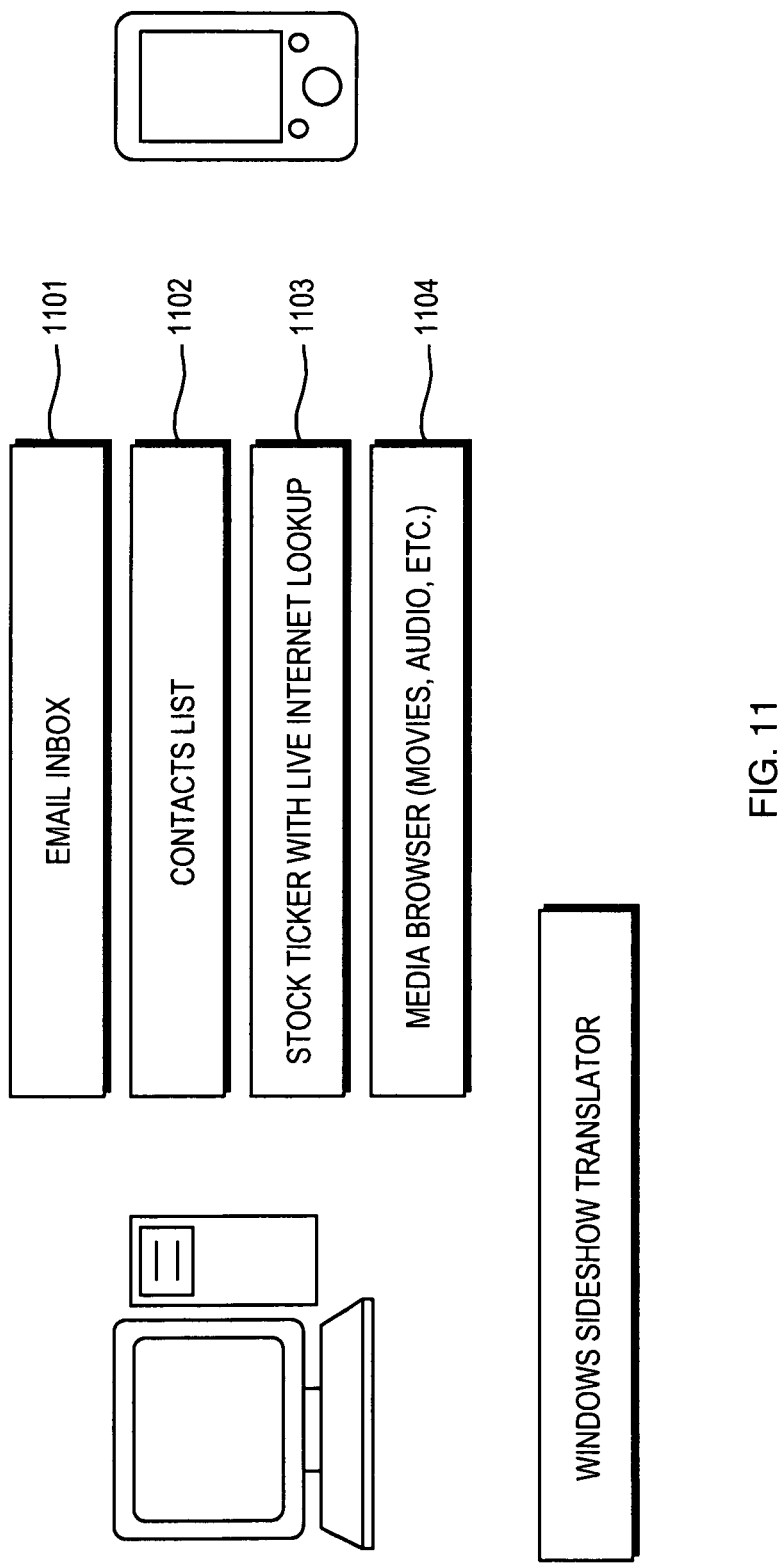
FIG. 11 is a block diagram illustrating device content.

FIG. 11 illustrates processing of device content by the servers 1001, 1002. These may include a content format piece for each type of respective content including email inbox 1101, contact list 1102, stock ticker 1103, media browser 1104 and the like. Each of these server functionalities 1101-1104 reformats its content using a page markup language. The page markup language can then be interpreted by the content browser 501 on the video headset device. The content browser 501 may now interpret the page markup language generically to fit the various requirements of the video headset device 100.

In alternate embodiments, a function such as a Windows Sideshow™ server may take formatted content from a Windows device and format it according to Sideshow requirements. Windows Sideshow is a technology introduced with the Windows Vista release of the Microsoft® operating system that enables Windows PC to drive a variety of auxiliary display devices connected to a main PC. These devices can be separate from or integrated in to the main PC, e.g., and display embedded on the outside of the laptop lid, etc.

With the virtual network and/or SideShow functionality, the wireless headset device can also become a "chameleon", in effect taking on the same user screen, same graphical user interface, and familiar user control of the host device. Even if the device 100 accepts several hosts at the same time (i.e., a blackberry, a cell phone, and a PC), the user is permitted to switch between the host devices. Each time a user makes such a switch, the user can see and still recognize the familiar slave or host and device user screen, the same graphical user interface (GUI), and same familiar controls and commands.

It is thus now understood how content can be viewed by the portable video headset 100 in different ways, all selectable by the user, including:

new applications written for the device itself; device applications, web applications, a web browser, etc.; and Microsoft® SideShow applications, or native applications via a virtual network connection.

With the Bluetooth proxy support, the effect of pushing through original hosted device GUI interface, screens, command and control interfaces, can be supported for multiple devices at the same time.

While this invention has been particularly shown and described with references to example embodiments thereof, it will be understood by those skilled in the art that various changes in form and details may be made therein without departing from the scope of the invention encompassed by the appended claims.

What is claimed is:

1. A headset computing device controlled by a user comprising:
   a user input device configured to receive speech data from the user and generate a control signal based on the speech data;
   a display panel;
   a support structure configured to support the display panel to the head of the user;
   a wireless communications interface configured to maintain simultaneous communication paths with a plurality of external host devices controlled by the same user of the headset computing device, said plurality of external host devices comprising a first device and a second device, and said wireless communications interface further configured to transmit the control signal based on the speech data generated by the user input device to a selected one of the first device and the second device, the transmitted control signal configured to provide control of the selected one of the first device and the second device and an application running on the selected one of the first device and the second device, and receive visual content from the selected one of the first device and the second device, the visual content being a representation of visual content output of the application running on the selected one of the first device and the second device; and
   a display driver stored in a memory and configured to generate a graphical interface to display the received visual content from the application running on the selected one of the first device and the second device on the display panel;
   wherein the one of the first device and the second device compresses the visual content from the application into the representation of the visual content and the display driver of the headset computing device decompresses the representation to display the received visual content, such that the application is compressed and decompressed by computing devices controlled by the same user, the computing devices being the headset computing device and external host computing device.

2. The device of claim 1 wherein the device driver is further configured to generate the graphical interface based on the received visual content conforming with Windows SideShow.

3. The device of claim 1 wherein the memory stores a virtual network client application for viewing a user display provided by the selected one of the first device and the second device.

4. The device of claim 1 wherein the wireless communications interface is WiFi, WiMax, Cellular, Satellite or other wireless network physical layer with an appropriate proxy to implement a packet switching gateway.

5. The device of claim 1 wherein the display driver is configured to generate a graphical interface for each different type of the plurality of external host computing devices with which the wireless communications interface may communicate to transform the visual content received from each external host computing device to a generic format to display the visual content in an expected format regardless of which type of external host computing device provides the visual content.

6. The device of claim 1 wherein the display driver is configured to receive a markup language specification of the received visual content representing the application running at the selected one of the first device and the second device, the display driver further configured to generate the graphical interface by rendering the markup language specification of the application running at the first devices as the graphical interface on the display panel.

7. The device of claim 1 wherein the display driver is further configured to provide a graphical interface to the plurality of external host computing devices.

8. The device of claim 7 wherein the display driver is further configured to provide graphical interfaces to and control of external host computing devices for a user of each respective external host computing device of said plurality of external host computing devices.

9. A method of receiving visual content in a headset computing device controlled by a user comprising:
generating a control signal in the headset computing device based on a speech input by the user;
providing a wireless communications interface configured to maintain simultaneous communication between the headset computing device and different ones of a plurality of external host computing devices controlled by the same user of the headset computing device;
transmitting the control signal generated from the input device of the headset computing device over the wireless communications interface to a selected device of said plurality of external host computing device, the transmitted control signal configured to provide control of the selected device and an application running on the selected device;
controlling the application running on the selected device by the control signal generated by the user input device;
receiving visual content at the headset computing device from the selected device, over the wireless communications interface, the visual content being a representation of output of visual content output of the application running on the selected device;
generating a graphical interface of the received visual content from the application running on the selected device; and
displaying the visual content on a display panel in the headset computing device;
wherein the selected device compresses the output of visual content output of the application into the representation of the visual content and the display driver of the headset computing device decompresses the representation to display the received visual content, such that the application is compressed and decompressed by computing devices controlled by the same user, the computing devices being the headset computing device and external host computing device.

10. The method of claim 9 further comprising supporting Windows SideShow over the wireless communications interface.

11. The method of claim 9 wherein the graphical user interface is a user display provided by the selected device via a virtual network client application.

12. The method of claim 9 wherein the wireless communications interface is WiFi, WiMax, Cellular, Satellite or other wireless network physical layer with an appropriate proxy to implement a packet switching gateway.

13. The method of claim 9 further comprising:
transforming the visual content received from the selected external host computing device with which the wireless communications interface may receive visual content to a graphical interface of the visual content in a generic display format; and
utilizing the same generic display format to display the visual content in an expected format regardless of which type of external host computing device provides the visual content.

14. The method of claim 9 further comprising receiving a markup language specification of the received visual content representing the application running at any one of the plurality of external host computing devices, the device driver further configured to enable generating of the graphical interface by rendering the markup language specification of the application running at one of the plurality of external host computing devices as the graphical interface on the display panel.

15. The method of claim 9 further comprising providing a graphical interface to multiple external host computing devices.

16. The method of claim 15 further comprising providing graphical interfaces to and control of external host computing devices.

17. An apparatus comprising:
means for receiving by a wireless computing device over a wireless communications interface different visual content from different external host computing devices of a plurality of external host computing devices for a given visual content, the visual content being a representation of visual content output of an application running on the respective external host computing device; and
means for generating a graphical interface of the received visual content from the application running on the respective external host computing device;
means for displaying the graphical interface on a display panel supported on a support structure configured to support the display device to the head of a user;
means for controlling the application running on the respective external host computing devices via the wireless communications interface according to a control signal generated by a user input device, the user input device generating the control signal based on received speech data from the user; and
means for simultaneously maintaining a communication path with different ones of the plurality of external host devices, and transmitting the control signal based on the speech data generated by the user input device to the respective external host computing device via the wireless communications interface, the transmitted control signal configured to provide control of the respective external host computing device and the application running on the respective external host computing device;
wherein the respective external host computing device compresses the visual content output of the application into the representation of the visual content and the display driver of a headset computing device decompresses the representation to display the received visual content, such that the application is compressed and decompressed by computing devices controlled by the same user, the computing devices being the headset computing device and the plurality of external host computing devices.

18. A system comprising:
a wireless video headset device configured to maintain simultaneous communication with a plurality of external host computing devices controlled by the same user of the wireless video headset device;
wherein the wireless video headset device generates a control signal based on a speech input by the user and transmits the control signal to a selected device of said plurality of external host computing devices, the control signal configured to provide control of the selected device and an application running on the selected device, the selected device transmitting visual content of the application running on selected device in response to the control signal from the video headset device and a display driver of the wireless video headset device configured to generate a graphical interface to display the visual content in the wireless video headset device, the visual content being a representation of visual content output of the application running on the selected device;
wherein the selected device compresses the visual content output of the application into the representation of the visual content and the display driver of the wireless video headset device decompresses the representation to display the received visual content, such that the application is compressed and decompressed by computing devices controlled by the same user, the computing devices being the headset computing device and external host computing devices.

\* \* \* \* \*